United States Patent [19]

Zeidan

[11] Patent Number: 5,547,287
[45] Date of Patent: Aug. 20, 1996

[54] METHOD AND BEARING CONSTRUCTION FOR CONTROL OF HOT OIL CARRYOVER AND LOSS OF LUBRICANT

[75] Inventor: Fouad Y. Zeidan, Warwick, R.I.

[73] Assignee: KMC, Inc., R.I.

[21] Appl. No.: 162,760

[22] Filed: Dec. 7, 1993

[51] Int. Cl.⁶ .................................................... F16C 17/03
[52] U.S. Cl. ........................ 384/117; 384/114; 384/137; 384/311
[58] Field of Search ........................ 384/117, 119, 384/466, 122, 114, 137, 311

[56] References Cited

U.S. PATENT DOCUMENTS

| | | | |
|---|---|---|---|
| 1,523,523 | 1/1925 | Guetl | 384/137 |
| 1,664,878 | 4/1928 | Flintermann . | |
| 1,991,461 | 2/1935 | Howarth . | |
| 2,110,464 | 3/1938 | Kingsbury . | |
| 2,314,703 | 3/1943 | Howarth . | |
| 2,347,663 | 5/1944 | Carnahan . | |
| 2,424,028 | 7/1947 | Haeberlein . | |
| 3,085,838 | 4/1963 | Patterson | 384/466 |
| 3,107,955 | 10/1963 | Trumpler . | |
| 3,132,908 | 5/1964 | Grotzinger . | |
| 3,142,519 | 7/1964 | Abramovitz . | |
| 3,160,450 | 12/1964 | Gentiluomo . | |
| 3,298,751 | 1/1967 | Elwell . | |
| 3,384,425 | 5/1968 | Brown . | |
| 3,578,827 | 5/1971 | Smith . | |
| 3,586,401 | 6/1971 | Gravelle . | |
| 3,628,835 | 12/1971 | Cornish et al. | 384/466 |
| 3,639,014 | 2/1972 | Sixsmith . | |
| 3,677,612 | 7/1972 | Barnett et al. . | |
| 3,971,602 | 7/1976 | Anderson . | |
| 4,005,914 | 2/1977 | Newman . | |
| 4,099,799 | 7/1978 | Etsion . | |
| 4,227,752 | 10/1980 | Wilcock . | |
| 4,335,925 | 6/1982 | Stopp . | |
| 4,348,065 | 9/1982 | Yoshioka et al. . | |
| 4,496,251 | 1/1985 | Ide . | |
| 4,657,411 | 4/1987 | Bath . | |
| 4,668,106 | 5/1987 | Gu . | |
| 4,671,677 | 6/1987 | Heshmat et al. . | |
| 4,676,668 | 6/1987 | Ide . | |
| 4,699,525 | 10/1987 | Mizobuchi et al. . | |
| 4,726,695 | 2/1988 | Showalter . | |
| 4,738,453 | 4/1988 | Ide . | |
| 4,738,550 | 4/1988 | Gardner . | |
| 5,102,236 | 4/1992 | Ide . | |
| 5,125,754 | 6/1992 | Ide . | |
| 5,137,373 | 8/1992 | Ide . | |
| 5,222,815 | 6/1993 | Ide . | |
| 5,255,984 | 10/1993 | Ide . | |

*Primary Examiner*—Lenard A. Footland
*Attorney, Agent, or Firm*—Michael D. Bednarek; Kilpatrick & Cody

[57] ABSTRACT

A method and bearing construction for inhibiting hot oil carryover in hydrodynamic bearings. The method includes supporting the pads so that they form a hydrodynamic wedge and supplying oil to the entrance of the wedge. The oil flowing through the wedge is pressurized and oil exiting the hydrodynamic wedge is directed away from the adjacent wedge. Oil is then supplied from another source to the adjacent wedge.

Various bearing constructions can be used to practice the method of the present invention. These bearing constructions include some form of a scraper to inhibit flow of hot oil. The scraper is located between the trailing edge of one bearing pad and the fluid nozzle passage of an adjacent pad. The scraper may be integrally formed with the bearing pad or it may be separate. The scraper may be pushed toward or away from the shaft using electrical, mechanical, hydraulic or magnetic devices.

An alternative form of hydrodynamic bearing including two different types of pads is also disclosed. In this bearing, at least one of the sets of pads is movable toward and away from the shaft to provide both a scraping function and a support function.

14 Claims, 5 Drawing Sheets

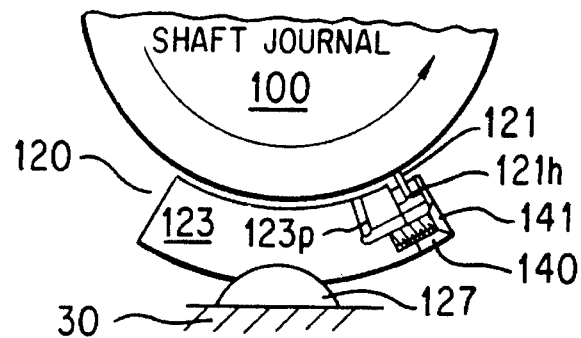
FIG. 2D
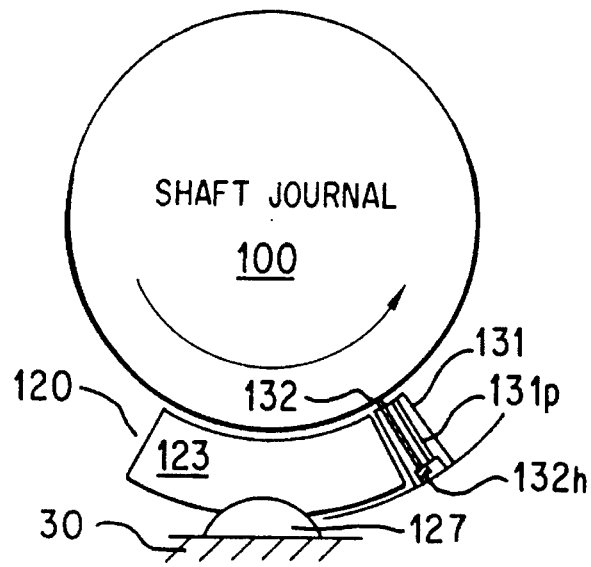
FIG. 2E
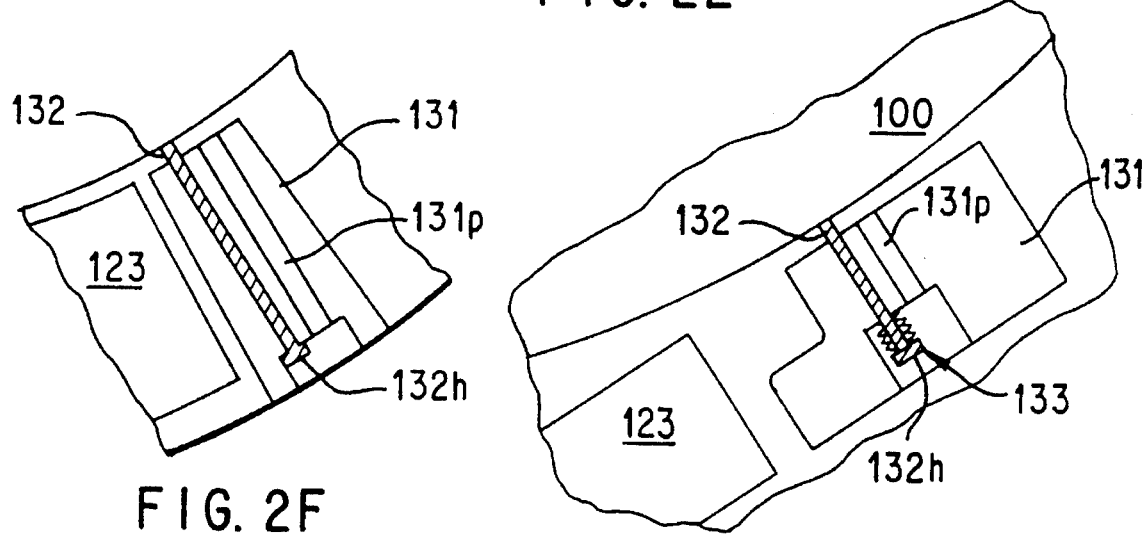
FIG. 2F
FIG. 2G

METHOD AND BEARING CONSTRUCTION FOR CONTROL OF HOT OIL CARRYOVER AND LOSS OF LUBRICANT

FIELD OF THE INVENTION

This invention relates to a method and structure for controlling the amount of hot oil carryover in journal and thrust bearings. The invention is particularly advantageous in high speed bearings and large bearings where the surface speed can result in higher percentage of the hot oil carryover from the preceding pad.

BACKGROUND OF THE INVENTION

The present invention relates to hydrodynamic bearings. In such bearings, a stationary bearing pad supports a rotating object such as a shaft via a pressurized fluid such as oil, air or water. Hydrodynamic bearings take advantage of the fact that when the rotating object moves, it does not slide along the top of the fluid. Instead, the fluid in contact with the rotating object adheres to the rotating object. Motion is thus accompanied by slip or shear between the fluid particles through the entire height of the fluid film. Thus, if the rotating object and the contacting layer of fluid move at a velocity that is known, the velocity at intermediate heights of the fluid thickness decreases at a known rate until the fluid in contact with the stationary bearing pad adheres to the bearing pad and is motionless. When, the bearing pad deflects at a small angle to the rotating because of the load resulting from its support of the rotating object, the fluid will be drawn into the wedge-shaped opening. Sufficient pressure is then generated in the fluid film to support the load. This fact is used in both thrust bearings and hydrodynamic journal bearings.

Thrust bearings and radial or journal bearings typically include shaft supporting pads spaced about an axis. The pads are spaced about an axis that generally corresponds to the longitudinal axis of the shaft to be supported for both thrust and journal bearings. This axis may be termed the major axis.

U.S. Pat. No. 3,107,955 to Trumpler discloses one example of a bearing having beam mounted bearing pads. The pads move with a pivoting or swing-type motion about a center located in front of the pad surface. This bearing, like many prior art bearings, is based only on a two dimensional model of pad deflection. Consequently, optimum wedge formation is not achieved.

In the Hall patent, U.S. Pat. No. 2,137,487, there is shown a hydrodynamic moveable pad bearing that develops its hydrodynamic wedge by sliding of its pad along spherical surfaces. Often the pad sticks and the corresponding wedge cannot be developed. In the Greene Patent, U.S. Pat. No. 3,930,691, elastomers provide the rocking. Such elastomers are subject to contamination and deterioration.

U.S. Pat. No. 4,099,799 to Etsion shows a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are shown.

U.S. Pat. No. 4,496,251 shows a pad that deflects with web-like ligaments to form a wedge shaped film of lubricant between the relatively moving parts.

U.S. Pat. No. 4,515,486 shows hydrodynamic thrust and journal bearings comprising several bearing pads, each having a face member and a support member that are separated and bonded together by an elastomeric material.

U.S. Pat. No. 4,526,482 shows hydrodynamic bearings primarily intended for process lubricated applications, i.e., the bearing is designed to work in a fluid. The hydrodynamic bearings are formed with a central section of the load carrying surface that is more compliant than the remainder of the bearings. Accordingly, the central section will deflect under load and form a pressure pocket of fluid to carry high loads.

It has also been noted, in Ide U.S. Pat. No. 4,676,668, that bearing pads may be spaced from the support member by at least one leg that provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments. These teachings are applicable to both journal and thrust bearings.

Presently, the most widely used hydrodynamic thrust bearing is the so-called Kingsbury shoe-type bearing. The shoe-type Kingsbury bearing is characterized by a complex structure that includes pivoted shoes, a thrust collar which rotates with the shaft and applies load to the shoes, a base ring for supporting the shoes, a housing or mounting which contains and supports the internal bearing elements, a lubricating system and a cooling system. Because of this complex structure, Kingsbury shoe-type bearings are typically extraordinarily expensive.

Additional background relating to hydrodynamic bearings may be gleaned by reviewing recently issued patents including U.S. Pat. No. 5,255,984 that shows a variable characteristic thrust bearing. The bearing includes separately formed pads of various forms and materials supported in a carrier. The carrier is constructed such that the pads may be located in separate openings to vary the support characteristics.

U.S. Pat. No. 5,222,815 shows a variety of unitary bearings, including journal, thrust and combined radial and thrust bearings of the type having beam mounted bearing pads. The pads and support structure may be integrally formed as a single piece. Similarly, U.S. Pat. No. 5,137,373 shows thrust, radial and combined radial/thrust bearings in which the pads and support structure are integrally formed as a single piece.

U.S. Pat. No. 5,125,754 shows thrust and journal bearings having a modular construction. In general, the bearings shown therein include separate pads or pad portions mounted in a separate carrier. Various pad and carrier configurations are disclosed.

U.S. Pat. No. 5,102,236 shows hydrodynamic thrust and radial bearings having a continuous beam mounted shaft support surface.

This application is specifically directed to the problem of hot oil carryover in hydrodynamic bearings. As recognized by persons skilled in the art, hot oil carryover, i.e., lubricant flow from one pad's trailing edge to the leading edge of the subsequent pad, can lead to reduced performance and even failure of pad type bearings.

U.S. Pat. No. 4,348,065 to Yoshioka addresses the problem of hot oil carryover. Yoshioka shows a thrust bearing or tapered land bearing which includes lubricant feeding nozzle holes. The nozzle holes are disposed near the leading edge of a tapered surface of a thrust bearing surface. This arrangement is said to minimize hot oil carryover.

SUMMARY OF THE INVENTION

According to the present invention conventional hydrodynamic bearings and more advanced one-piece tilting pad fluid film bearings can be designed to control the amount of hot oil carryover in journal and thrust bearings.

The underlying concept of this application is applicable to both thrust and journal bearings. Specifically, the trailing edge of the pad is raised by machining or by means of mechanical, hydraulic, magnetic or electrical devices. The extent to which the trailing edge can be moved toward the shaft section to be supported determines the amount of hot oil carryover to the next pad. In accordance with the present invention, a scraping action is provided to direct oil away from the pad to the sides, thus allowing the directed cool oil to more effectively provide better coolant to the next pad. This feature also removes and reduces the negative effects of the hot oil carryover and permits a reduction in the groove spacing between pads to allow more effective pad surface area to carry the load. Consequently, a bearing of the same size can carry more load and run at lower temperatures in thicker film.

The method for reducing hot oil carryover in a hydrodynamic bearing according to the present invention includes the steps of supporting the bearing pads so that they move under load to form a hydrodynamic wedge with respect to the shaft, supplying oil to the entrance of the wedge, directing the flow of oil exiting the hydrodynamic wedge of one pad away from the adjacent wedge and supplying oil from another source to the adjacent wedge.

The present invention further provides a hydrodynamic bearing for supporting a rotating shaft. The bearing includes a plurality of bearing pads supported on a base for movement with respect to the shaft. Each of the bearing pads has a leading edge and a trailing edge. The trailing edge is the edge closest to the shaft surface. A nozzle is located between each bearing pad and the bearing pad immediately adjacent thereto. The nozzles include a nozzle fluid passage for supplying lubricant to the leading edge of a bearing pad. A scraping means for inhibiting the flow of lubricant between the bearing and the shaft is provided. The scraping means is located between the trailing edge of each bearing pad and the nozzle fluid passage for supplying lubricant to the leading edge of the adjacent pad. Preferably, means are provided for directing fluid away the trailing edge of the bearing pad.

The scraping means may comprise a radially inward extending extension of the trailing edge formed integrally with the bearing pad. Alternatively, the scraping means may be formed separately. In either instance, the scraping means may comprise an element that is spring biased into contact with the shaft surface. Alternatively, the scraping means may comprise an element having one end near the shaft surface and an expanded head at the other end and means for directing pressurized fluid against the expanded head portion to push the scraper toward the shaft. In that case, a spring may be provided to counteract the force of the fluid pressure and bias the scraping means away from the shaft surface to be supported.

The present invention also provides a hydrodynamic bearing for supporting a rotating shaft that includes a first plurality of bearing pads and a second plurality of bearing pads. A single thin web supports each pad of the first plurality. A circumferentially extending beam supports each pad of the second plurality. This beam underlies at least part of the lower side of one bearing pad of the first plurality to define a thin radial gap between the bearing pad and the circumferential beam. A fluid passage extends from the surface of the bearing pads of the first plurality to the gap between the bearing pad and the circumferential beam to provide pressurized fluid to the gap. This pressurized fluid can be used to tend to push the circumferential beam, and consequently the pad of the second plurality of bearing pads, away from the shaft portion to be supported. A spring means is provided for biasing the bearing pads of the second plurality toward the shaft to be supported.

BRIEF DESCRIPTION OF THE DRAWINGS

FIG. 2D shows a journal bearing construction in which scraping action is provided by a piston-like attachment to the pad that is fed with pressure from the pad surface.

FIG. 2E shows another form of tilting pad journal bearing according to the present invention in which scraping action is provided by a movable scraper attached to the pressure feed nozzle.

FIG. 2F is a detailed view of FIG. 2E.

FIG. 2G shows another form of tilting pad journal bearing according to the present invention in which scraping action is provided by a scraper secured to the feed nozzle.

DETAILED DESCRIPTION

The underlying concept of this application is applicable to both thrust and journal bearings. Specifically, the trailing edge of the pad is raised by machining or by means of mechanical, hydraulic, magnetic or electrical devices. The extent to which the trailing edge can be moved toward the shaft section to be supported determines the amount of hot oil carryover to the next pad. According to the present invention, a scraping action is provided to direct oil away from the pad to the sides. This allows the directed cool oil to more effectively provide better coolant to the next pad. This feature also removes and reduces the negative effects of the hot oil carryover and permits a reduction in the groove spacing between pads to allow more effective pad surface area to carry the load. Consequently, a bearing of the same size can carry more load and run at lower temperatures in thicker film.

The method for reducing hot oil carryover in a hydrodynamic bearing according to the present invention includes the steps of supporting the bearing pads so that they move under load to form a hydrodynamic wedge with respect to the shaft, supplying oil to the entrance of the wedge, directing the flow of oil exiting the hydrodynamic wedge of one pad away from the adjacent wedge and supplying oil from another source to the adjacent wedge.

Figure 1A:
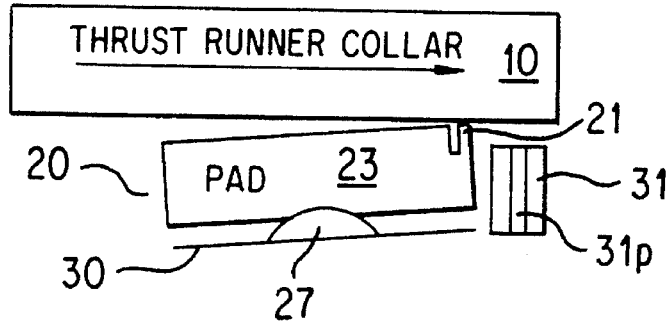
FIG. 1A shows, in section and somewhat schematically, a first tilting pad thrust bearing according to the present invention in which scraping action is provided by an integral piece.
Figure 1B:
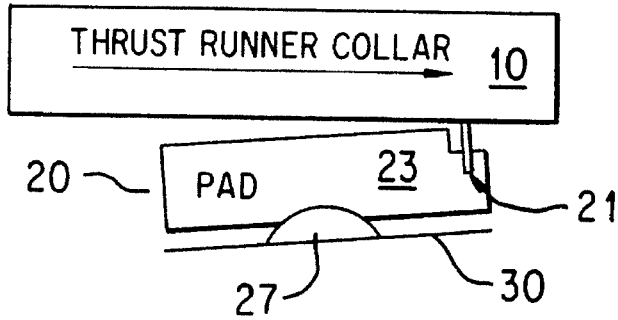
FIG. 1B shows, in section and somewhat schematically, a second tilting pad thrust bearing according to the present invention in which scraping action is provided by an attachment to the pad.
Figure 1C:
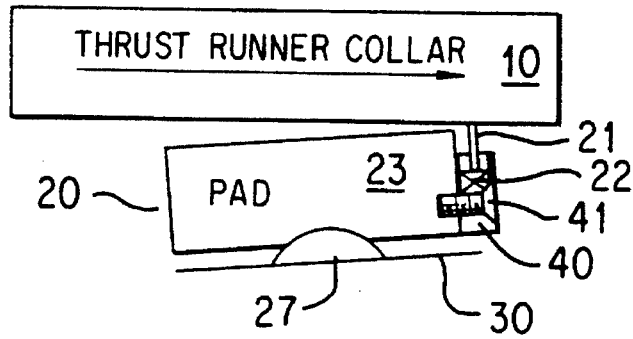
FIG. 1C shows another form of tilting pad thrust bearing according to the present invention in which scraping action is provided by a spring loaded attachment to the pad.

FIGS. 1A–1C show how the method of the present invention is applied to a thrust tilting pad bearing. This concept is applicable to any thrust or journal bearing fixed or tilting. The trailing edge of the pad is raised either by machining or by means of mechanical, hydraulic, magnetic or electrical device. The amount of hot oil carryover to the next pad is determined by the amount of movement the trailing edge can be raised during operation of the bearing. Scraping action is provided to direct the oil away from the pad to the sides. This allows the directed cool oil to more effectively provide better cooling to the next pad. This feature, which removes and reduces the negative effects of the hot oil carryover, can also permit reduction in the groove spacing between pads. Thus, more effective pad surface area can carry the load. Accordingly, a bearing of the same size can carry more load and run at lower temperatures and thicker film if the scraping action of the hot oil is used.

FIGS. 1A–1D illustrate different configurations that can be used to achieve the same effect. In these drawings, only one pad is shown. It should be understood, however, that the bearings include a plurality of circumferentially spaced bearing pads. It is further understood that, in operation, the trailing edge of one bearing pad is near the leading edge of an adjacent pad. Specifically, the scraping action can be provided by a piece that is integrally formed with the pad or by an attachment to the pad or the adjacent nozzle. The scraping action can be fixed or automatically controlled by the pressure in the oil feed or the pressure in the pad or external pressure.

FIG. 1A schematically shows an embodiment of a tilting pad thrust bearing in which the scraping action is provided by an integrally formed scraper. The scraper 21 is integrally formed on the thrust pad 23 of the bearing 20 at the trailing edge of that pad 23. Consequently, the scraper is essentially a radial extension of the bearing pad's trailing edge. A support structure 27 supports the pad 23 for tilting movement. A rigid base 30 supports the support structure 27 nozzle 31 is provided near the trailing edge of the pad 23.

Persons skilled in the art will understand that the thrust bearing 20, which is only partially shown in FIG. 1A, includes a series of circumferentially spaced pads that together support part of a rotating shaft 10, most typically a thrust runner collar. The direction of movement of the shaft relative to the pad is illustrated by the arrow in FIG. 1A.

In a typical tilting pad bearing construction the nozzle 31 is located between adjacent pads. Although the second pad is not shown, it should be understood that the nozzle 31 is located adjacent the leading edge of that pad. Accordingly, lubricant may be supplied through a passage 31p formed in the nozzle to supply fresh, preferably cooler, oil or other lubricant to the wedge of the pad following the wedge shown. The scraper 21 limits the amount of hot oil that is carried past the pad 23 and causes this hot oil to flow into a recess 23r formed in the pad and subsequently out the radially inner and outer edges of the pad.

FIG. 1B illustrates a tilting pad thrust bearing construction similar to that of FIG. 1A. Like the bearing of FIG. 1A, the bearing 20 includes a plurality of circumferentially spaced pads only one of which is shown in the figure. Here, however, a separate scraper 21 secured in the pad 23 proximate the trailing edge of the pad provides the scraping action. As shown in FIG. 1B, the scraper 21 is in contact with the portion of the shaft 10 to be supported, typically a thrust runner collar. The scraper 21 is formed of a low friction bearing grade material. Any suitable plastic or metal bearing grade low friction material may be used.

FIG. 1C shows a tilting pad bearing construction similar to that shown in FIGS. 1A and 1B. Again, the bearing 20 includes a plurality of circumferentially spaced pads only one of which is shown. The pads 23 support part of a shaft 10, typically a thrust runner collar. The pads 23 are supported on a support structure 27 mounted on a base 30. In these respects, the bearing of FIG. 1C is identical to the bearings of FIGS. 1A–1B. In the bearing of FIG. 1C, however, the scraping action is provided by a scraper 21 mounted in an attachment piece 40 secured to the trailing edge of the bearing pad 23 by a bolt 41 or similar attachment means. Moreover, the scraper 21 is spring loaded by means of a spring 22 which biases the scraper 21 into contact with the portion of the shaft to be supported 10.

Figure 1D:
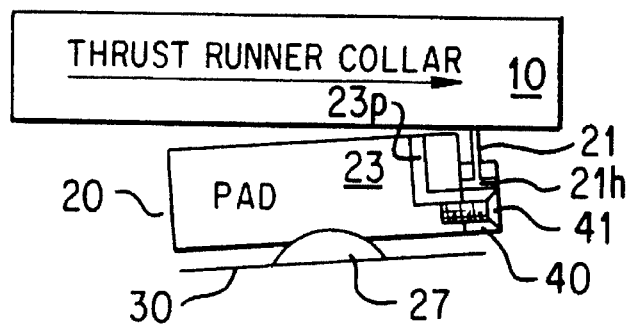
FIG. 1D shows another form of tilting pad thrust bearing in which scraping action is performed by a movable scraper.

FIG. 1D shows another form of tilting pad thrust bearing according to the present invention. This embodiment is similar to the previously described embodiment in that the bearing 20 includes the plurality of spaced pads 23 mounted on a support structure 27 mounted on a base 30. The pads support part of a shaft 10, typically a thrust runner collar. Like the embodiment of FIG. 1C, the embodiment of FIG. 1D includes a scraper 27 that is movable toward and away from the portion of the shaft 10 to be supported. Instead of using a spring to bias the scraper 21 toward the shaft portion 10, a pressure feed passage 23p permits the flow of pressurized lubricant from a high pressure region of the surface of the pad 23. The pressurized lubricant pushes the scraper 21 toward the surface of the shaft to be supported. By virtue of this construction, the scraper 21 is pushed toward the thrust collar 10 in the manner of a piston. To facilitate this function, the scraper 21 preferably includes an expanded head portion 21h at the end of the scraper opposite the end that contacts the shaft portion to be supported.

Figure 2A:
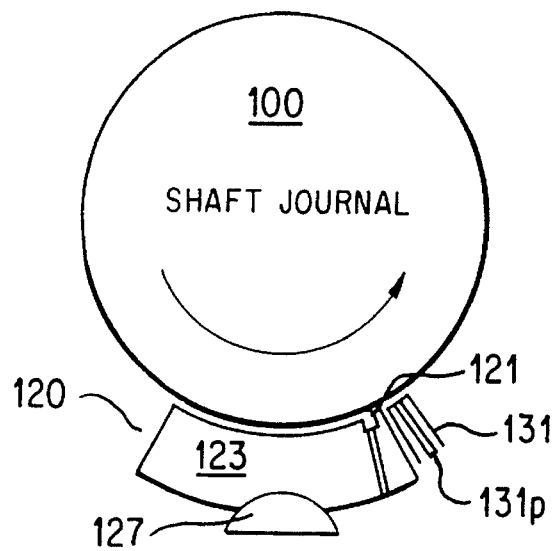
FIG. 2A shows, in section and somewhat schematically, a first journal bearing according to the present invention in which scraping action is provided by an integral scraper.
Figure 2B:
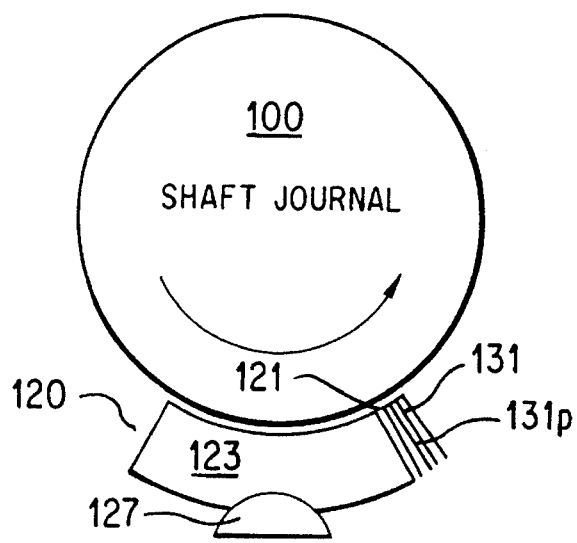
FIG. 2B shows, in section and somewhat schematically, a second journal bearing according to the present invention in which scraping action is provided by a scraper fixed or integral with the feed nozzle.

FIGS. 2A–2G show how this hot oil carryover control can be applied to fixed and tilting pad journal bearings. Again, only a single pad is illustrated with the understanding that the bearing includes a plurality of circumferential spaced pads of identical construction. The scraping can be achieved by a part integral with the pad, attached to it, or by a part attached to, or part of, the directed lube feed nozzle 131 as shown in FIG. 2B. The rest of the illustrations in FIGS. 2A and 2C–2G show other means of controlling the radial movement of the scraper toward the shaft. This concept is also applicable to point pivot tilt pad bearings, rocker back or line pivot, spherical seated and ball-in-socket designs, as well as the flexible pad designs. It is also applicable to fixed geometry sleeve bearings with all their different configurations.

Each of FIGS. 2A–2G show alternate constructions for journal bearings according to the present invention illustrate only a single bearing pad 120 supporting a shaft journal 100. Those of skill in the art recognize, however, that such journal bearings typically include a plurality of bearing pads spaced about the circumference of the shaft journal. Moreover, a lubricant feed nozzle often is provided between each pair of adjacent bearing pads to supply lubricant to the leading edge of one of the two pads.

FIG. 2A shows, in partial cross-section, a construction in which the bearing pads 120 include a circumferentially curved pad portion 123 supported on a support structure 127 for pivoting or tilting relative to a base 30. Conceptually, the embodiment of FIG. 2A is similar to the thrust bearing embodiment of FIG. 1A. In particular, the bearing pad 123 is provided with an integrally formed scraper 121 proximate the trailing edge of the bearing pad 123. A lubricant feed nozzle 131 is located near the trailing edge of the pad 123 and just before the leading edge of an adjacent pad not shown. As with the thrust bearings discussed previously, the scraper 121 prevents or limits carryover of oil that has passed through the hydrodynamic wedge formed between the pad 123 and the shaft journal 100 and directs such hot oil away from the subsequent pad. In this case, a passage 123p is provided through the bearing pad 123 such that oil from the wedge is directed below the pad 123.

FIG. 2B shows part of a bearing construction similar to that of FIG. 2A except that the scraper 121 is fixed on or formed integrally with the nozzle 131. As a result, the pad 123 can have a conventional configuration as schematically shown in FIG. 2B. As is plain from the schematic drawing of FIG. 2B the scraper 121 contacts or inhibits the carryover of hot oil exiting the trailing edge of the pad 123. The oil is forced along the trailing edge and away from the leading edge of the adjacent pad (not shown).

Figure 2C:
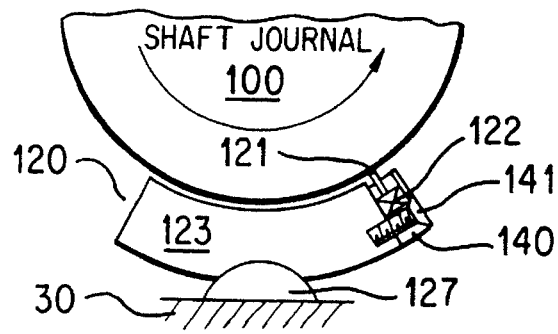
FIG. 2C shows a journal bearing in which scraping action is provided by a spring loaded attachment to the pad.

FIG. 2C shows, in partial cross-section, another form of tilt pad journal bearing according to the present invention. This embodiment is conceptually similar to the thrust bearing embodiment shown in FIG. 1C. In particular, the scraping action is provided by a separate scraper 121 that is mounted in an attachment device 140 secured to the trailing edge of the bearing pad 123 by a bolt 141 or similar attachment means. Again, a spring 122 biases the scraping means 121 toward the shaft journal 100. As with all of the embodiments disclosed herein, the arrow in the figure indicates the direction of shaft rotation.

FIG. 2D shows, in partial cross-section, another embodiment of the journal bearing according to the present invention. This embodiment is conceptually similar to the thrust bearing embodiment of FIG. 1D. In particular, the scraping action is provided by a separate scraper 121 mounted in an attachment device 140 secured to the trailing edge of the bearing pad 123 by a bolt or similar attachment means. A fluid passage 123p formed in the bearing pad 123 permits fluid from the hydrodynamic wedge formed between the pad 123 and the shaft 100 to push against a head portion 121h of the scraper 121 to bias the scraper 121 into contact with the shaft 100.

Concerning the embodiments shown in FIGS. 1D and 2D, it should be easily appreciated by persons skilled in the art that the force pushing the scraper 21 or 121 against the shaft will be in direct proportion to the pressure in the hydrodynamic wedge. Accordingly, this construction has a self-adjusting characteristic.

FIG. 2E shows another embodiment of the journal bearing according to the present invention. In this embodiment, as with the embodiment of FIG. 2B, the scraping action is provided by a scraper secured to the fluid pressure nozzle 131. This permits the use of conventional pads 123 mounted on supports 127. Persons skilled in the art will recognize that such a construction also permits retrofitting of conventional bearings if needed, without altering the bearing pad.

The embodiment of FIG. 2E differs from the embodiment of FIG. 2B in that the scraper 132 is movable relative to the nozzle 131. In particular, the scraper 132 may slide radially toward and away from the shaft journal 100. As best shown in the detailed view of FIG. 2F, the scraper 132 includes a head portion 132h at the end of the scraper 132 opposite the end that contacts the shaft 100. The head portion 132h of the scraper is in fluid communication with the supply of pressurized fluid passing through the fluid passage 131p and the nozzle 131. Accordingly, the fluid supplied to the passage 131p also pushes the scraper 132 toward the shaft 100. This makes it possible to adjust the force by which the scraper 132 presses against the shaft 100 readily. In addition, it is contemplated that alternate means for adjustably pressing the scraper 132 against the shaft 100 could be used. For example, instead of using fluid pressure as in the embodiment of FIGS. 2E and 2F, mechanical, electrical or magnetic means could be used to push the scraper 132 toward the shaft 100. At present, however, it is believed that use of fluid pressure shown in FIGS. 2E and 2F is the best mode of adjustably pushing the scraper 132 toward the shaft journal 100.

FIG. 2G shows an embodiment similar to that of FIGS. 2E and 2F, but where the construction further includes a spring 133 pressing between a portion of the nozzle 131 and the scraper head 132h to bias the scraper 132 away from the shaft 100. In this construction, the supply of fluid that passes through the fluid passage 131p also acts on the scraper head 132h to counter act the force of the spring. This push pull type construction would be possible to move the scraper blade both toward and away from the shaft 100 by adjusting the pressure supplied in the chamber.

Figure 3:
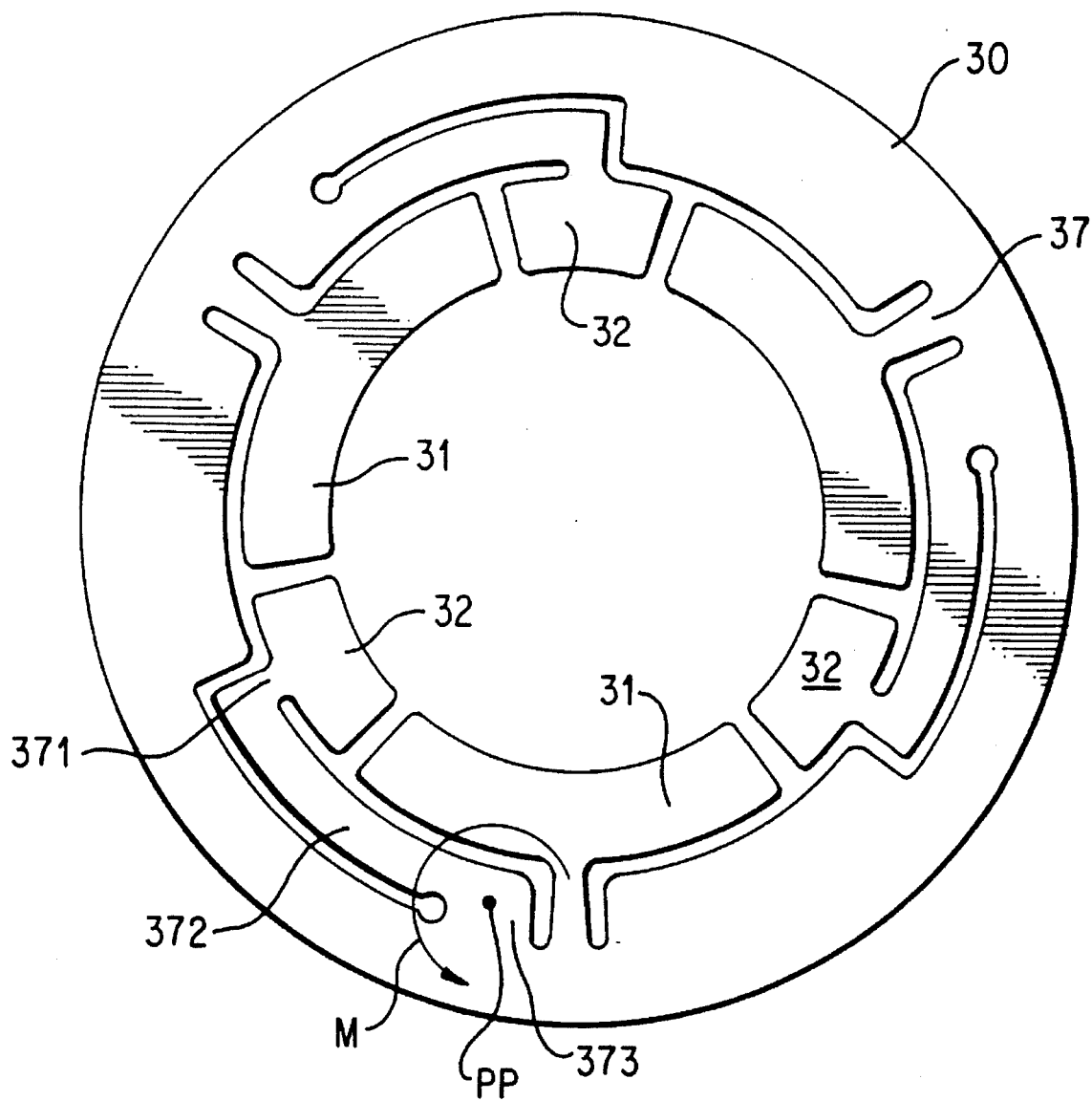
FIG. 3 shows a cross-section of a one-piece tilt pad bearing.

The present invention has previously been described in the context of conventional hydrodynamic bearings. The present invention is also applicable to one-piece bearings designed to operate as tilt-pad bearings in a lubricant filled environment. These include a single piece bearing in which at least some pads are supported on a single thin web. The pivot stiffness of such a pad is determined by the support web thickness. When the web thickness is low enough, tilt-pad behavior results. An example of one such bearing is shown in FIG. 3.

In such bearings, the effect of web thickness is typically expressed in terms of the principal stresses and cross coupled stiffness. Cross coupled stiffness is a term of art that can be thought of as a measure of the resistance to tilting. As tilt stiffness drops, the cross-coupling terms asymptotically approach zero, which by definition yields tilt-pad behavior. At high pad tilt stiffness, the cross-coupling asymptotically approaches the high (negative) fixed-geometry values, resulting in much lower stability that is characteristic of fixed-geometry bearings. The principle coefficients vary slightly from the asymmetric (unequal) fixed-geometry values, to symmetric (equal) values that are characteristic of a four-pad tilt-pad bearing with load between pads.

Tests and analysis have shown that the one-piece tilt pad bearing of the present invention exhibits fixed-geometry performance with high tilt stiffness, and tilt-pad, variable geometry, performance at low tilt stiffness. Intermediate stiffnesses reflect transition from fixed-geometry behavior to tilt-pad behavior. Thus, the web thickness must be chosen low enough to exhibit tilt-pad stability without becoming overstressed from shaft loads or tilt stresses. The tilt-stresses are low because of the very small tilt angles traversed by the pads during operation.

Another desirable feature available from the design of the bearings of the present invention is the narrower range or pre-load that can be obtained. Tilt pad bearings suffer from the stack-up in tolerances and thus result in a wide range of pre-load. This range increases as the bearing dimensions are reduced. The one-piece bearings of the present invention can, however, be manufactured to closer tolerances. In part, this is because the position of the components relative to one another is fixed in a one-piece design. Thus, tolerances are not additive.

FIG. 3 shows a side-view of a three pad positive-centering deflection pad bearing for use in applications where floating of the axis of rotation must be minimized or eliminated. As shown in FIG. 3, the bearing includes two different types of bearing pads: circumferentially short pads indicated at 32 and circumferentially long pads indicated at 31. The short pads 32 operate as flexible centering pads. These pads begin at zero clearance, i.e., shaft contact and expand at design speeds under hydrodynamic pressure to a larger operating clearance. The larger, centrally pivoted pads 31 offer low pivot rotational stiffness and high radial stiffness to attenuate unbalanced response and maintain stability.

The pads 31 are supported by a single ligament 37 for simple flexibility in the plane of the paper of the drawing. It is critical, however, that the ligaments be so thin as to offer virtually no resistance to pivots. At a minimum, the radial length of the ligaments should exceed their circumferential width. In essence, the larger pads 31 have a support structure 37 that allows simple pivoting of the pad 31. It is known that a simple pivoting construction like this provides adequate support at operational speeds.

To ensure proper shaft centering and support at start up, the smaller pads 32 have a more flexible support structure. Specifically, the support structure of the pads 32 includes a primary support portion 371 in the form of a stub type shaft, a secondary support portion in the form of an elongated circumferential beam 372 and a tertiary support portion 373 in the form of a stub shaft connecting the secondary support portion 372 to the base or outer periphery of the bearing 30. Because of the elongated nature of the beam 372, any force acting on the surface of the pad 32 causes pivoting about a pivot point PP as illustrated in FIG. 1C. This pivot point PP is located circumferentially beyond the trailing edge 32*t* of the bearing pads 32. Consequently, any force acting on the pad 32 causes a moment M to be generated in the direction shown in FIG. 1C. This ensures that under static state, contact between the pad 32 and the shaft occurs only at the trailing edge of the pad. In this way, a preformed wedge is formed even in the static state.

Moreover, the contact between the shaft and each trailing edge of each of the pads 32 collectively maintains the shaft center in the proper position. Thus, a hydrodynamic effect occurs immediately upon start up while the shaft is properly centered and shaft run out does not occur. Thus, this hydrodynamic bearing, unlike known hydrodynamic bearings, can be used in applications where shaft float is unacceptable such as, for example, a mechanical face seal of the gap type. The advantages of hydrodynamic bearings versus rolling element type bearings are set forth above. An additional important advantage occurs at high speed where rolling element bearings are subject to rapid wear, but hydrodynamic bearings perform without wear because there is no shaft-to-pad contact.

The particular bearing construction shown in FIG. 3 includes two types of pads support structures. This provides a wide range of support conditions. It should be understood, however, that bearings could be designed such that each pad is supported in the same way. If shaft centering is required, then each support structure should be designed like the support structure of the bearing pads 32 such that the pivoting caused by static load occurs beyond the trailing edge of the pad in the manner shown in FIG. 3C so that under static loading the pads are deflected to that only their trailing edge contacts the shaft. This ensures that a preformed wedge is formed and at the same time properly centers the shaft.

The bearing may be formed by machining a solid bronze puck through an electric discharge machining (EDM) process, but this is not required. According to the present invention, the webs 37 must support the pad with enough radial stiffness to support the shaft loads without becoming overstressed, while also providing enough rotational (tilt) flexibility to exhibit tilt-pad performance. Although the acceptable range of web thickness varies from application to application, the present inventor has found that the web thickness should, at minimum be less than the radial length of the web. If the webs are too thin, the web will be overstressed and the bearing will be destroyed. On the other hand, if the webs are too thick the pads will no longer function as tilt pads, instead functioning either in the transition regime or as fixed geometry pads. Of course, the stresses that result from tilting must also be within the endurance limit to avoid fatigue failure. The endurance limit is the allowable stress below which you can have an infinite number of cycles. Other facts that can affect performance include thermal effects and pad surface deflections. Optimization of the support structure configuration for individual applications precludes high stresses and ensures long life. As mentioned previously stresses are minimized because of the small tilt angle. The absence of moving parts eliminates pivot wear and durability concerns by eliminating the pivot pad contact stresses. Manufacturing tolerances are eliminated all but the final bearing bore, thus simplifying the manufacturing process. EDM manufacturing is efficient and accurate for low volume applications, while high volume applications can be cast, molded, extruded or forged as discussed herein.

Figure 3A:
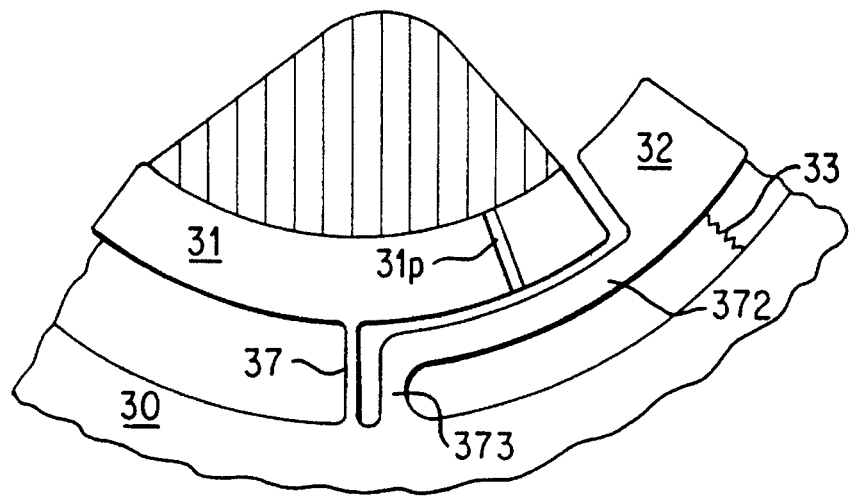
FIG. 3A shows a section of a new form of pad-type bearing that includes two different pads one of which can provide the scraping action according to the present invention

FIG. 3A shows, in section, part of a bearing similar to that shown in FIG. 3A that has been modified according to the present invention. In FIG. 3A, only one type of each pad 31, 32 is shown. Again, however, the bearing includes a plurality of spaced pads. The pressure profile formed along the large bearing pad 31 is illustrated in graphic form.

A fluid passage 31*p* is formed in the bearing pad 31*p* proximate its trailing edge. The fluid passage 31*p* allows high pressure fluid to flow from the pad surface into the gap between circumferential support beams 372 and the underside of the pad 31. The high pressure fluid thus pushes the circumferential support beam 372 and consequently pad 32 radially outward. A spring 33 is mounted between the base 30 and the pad 32. The spring biases the pad 32 radially inward in opposition to the fluid pressure.

By virtue of this construction, the pressure in the hydrodynamic film will push the smaller or softer pad 32 away. During normal operation, the hard pad 31 will support the load and the soft pad will be pushed away for lower churning loses. Upon loss of lubrication or dry running conditions, however, the soft pad 32 will press against the shaft and support the load. The soft pad preferably has a self-lubricating, bearing grade material construction.

Thus, the soft or smaller pads in this configuration can serve the dual purpose of supporting the shaft if the fluid is interrupted to the bearing or when the speed is too low to generate a sufficient oil film, and can also work to remove the hot oil carryover at higher speeds. The soft pad can be controlled by the pressure from the hard pad, but can also have a variety of controls that can achieve the same objective. These can be electrically, mechanically, hydraulically, or magnetically activated. The soft pad can be at the trailing edge and can also be at the leading edge of the hard pad. It can also be configured to be at the sides and does not have to be integral with the hard pad or the bearing shell. This concept can also apply to other tilt pad and fixed pad geometry and configurations. It can also apply to sleeve bearings with all their different sizes and configurations. This concept is also applicable to hydrodynamic, hydrostatic, and to hybrid hydrostatic-hydrodynamic thrust and journal bearings.

Figure 3B:
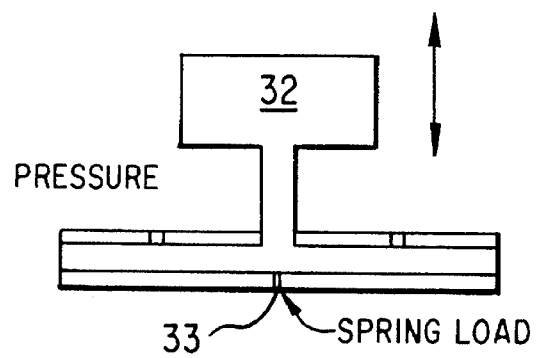
FIG. 3B illustrates, schematically, the relationship between the pressure force and the spring load in the embodiment of FIG. 3.

FIG. 3B schematically shows the interaction of the spring load and the fluid pressure and how these forces oppose one another.

Figure 4:
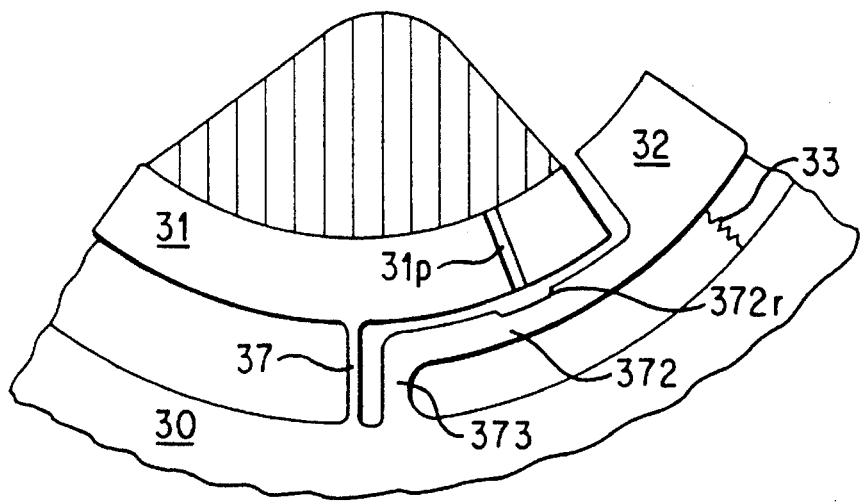
FIG. 4 shows, in section, an alternate embodiment of a bearing similar to that shown in FIG. 3.

FIG. 4 shows a variation of the modification shown in FIGS. 3A and 3B. In particular, the overall design is essentially the same as that of FIG. 3A except that a recess is formed in the surface of the circumferential beam 372 to ensure that fluid entering the gap between the circumferential beam 372 and the lower side of the pad 31 from the passage 31p acts at an expanded surface located sufficiently far from the cantilever support of the beam 372 to ensure proper operation. It is believed that this modification enhances performance.

FIG. 4 shows an illustration where the pressure in the pad recess is fed to a soft pad recess to control radial movement of the soft pad 32. This movement can also be used to actively control the clearance of the soft pads and to support the rotor in case of loss of the pressure. In some cryogenic applications, the bearing starts dry and uses the pressure in the pump or machine to lubricate the bearing. This concept will allow the shaft to start dry on the soft pads. As the pressure is developed in the machine and is fed to the bearing, this will push the soft pads radially out and allow the hard pads to support the shaft. Pushing the soft pads radially out will also result in lower power losses at high speeds where only part of the bearing is needed to support the load.

The present invention is also applicable to a deflection pad bearing which has a cantilevered support. The cantilevered support has a stop to limit the radial movement. This is provided to insure that the bearing preload does not become negative during operation. It is also provided to allow for a bi-linear spring effect. This allows the radial stiffness to reach a high level when the pad bottoms out against the stop. This prevents from the further degradation of the oil film coefficients, yet allows the bearing to have very fast start with a relatively small clearance. There is also an option in this concept for a hydrostatic feed in the squeeze film region under the cantilever. This allows for active control of the bearing clearance, and the squeeze film cavitation and damping control. The radial stiffness can be varied by controlling the thickness and length and material of the cantilever section. The hydrostatic pressure can also be used to modify this stiffness. The gap to the limit stop can vary the range of the softer spring and thus provide control of the radial stiffness. While discussed in connection with a deflection pad bearing, this concept can apply to any bearing configuration. A shim limits the movement of the pad toward the shell, or another bolt can be used to limit and adjust the movement of the pad toward the shaft. This bolt can be used in this manner to machine the preload in the radial bearings by some standard straight turning operations. The oil supply and pressurizing to the squeeze film cavity can be fed from the oil feed annulus, or fed directly from the pad hydrodynamic pressure region. The orifice and the recess can be varied to control the force and amount of closure required at certain speeds and loads. The clearance can thus be varied with the speed, load, and radial stiffness.

The land for the squeeze film can be made larger to more effectively provide a well damped support. This will provide damping even when the machine is not running but is being transported or on a land, sea, or air moving subject. Here it will also allow the machine to absorb shock loads during transportation and especially when the shaft is not spinning and the hydrodynamic wedge is not available. This also allows for thermal expansion.

What is claimed is:

1. A method for reducing hot oil carryover between adjacent bearing pads in a hydrodynamic bearing of the type having a plurality of movable bearings spaced about a shaft surface to be supported, the method comprising the steps of:

supporting the bearing pads so that they move under load to form a hydrodynamic wedge with respect to the shaft;

supplying oil to the entrance of the wedge;

directing the flow of oil exiting the hydrodynamic wedge of one pad away from the adjacent wedge; and supplying oil from another source to the adjacent wedge.

2. A hydrodynamic bearing for supporting a rotating shaft, the bearing comprising:

a plurality of bearing pads supported on a base for movement with respect to the shaft, each of the bearing pads having a leading edge and a trailing edge which is closest to the shaft surface;

a nozzle located between each bearing pad and the bearing pad immediately adjacent thereto, the nozzle including a nozzle fluid passage for supplying lubricant to the leading edge of a bearing pad; and scraping means for inhibiting the flow of lubricant between the bearing and the shaft, the scraping means comprising means located between the trailing edge of each bearing pad and the nozzle fluid passage for supplying lubricant to the leading edge of an adjacent pad.

3. The bearing of claim 2, wherein the scraping means comprises an element which is spring biased into contact with the shaft surface.

4. The bearing of claim 2, wherein the scraping means comprises a radially inward extending extension of the trailing edge formed integrally with the bearing pad.

5. The bearing of claim 2, wherein the scraping means comprises: a separate radially inward extending scrapper secured to the pad near the trailing edge.

6. The bearing of claim 2, wherein the scraping means comprises an element having one end near the shaft surface and an expanded head at the other end and means for directing pressurized fluid against the expanded head portion so as to push the scraping means toward the shaft.

7. The bearing of claim 6, further comprising a spring biasing the scraping means away from the shaft surface to be supported.

8. A hydrodynamic bearing for supporting a rotating shaft, the bearing comprising:

a plurality of bearing pads supported on a base for movement with respect to the shaft, each of the bearing pads having a leading edge and a trailing edge which is closest to the shaft surface;

scraping means for inhibiting the flow of lubricant between the bearing and the shaft, the scraping means comprising means located between the trailing edge of each bearing pad and the leading edge of an adjacent pad, wherein the scraping means comprises an element having one end near the shaft surface and an expanded head at the other end and means for directing pressurized fluid against the expanded head portion so as to push the scraping means toward the shaft.

9. The bearing of claim 8, further comprising a spring biasing the scraping means away from the shaft surface to be supported.

10. A hydrodynamic bearing for supporting a rotating shaft, the bearing comprising:

a plurality of bearing pads supported on a base for movement with respect to the shaft, each of the bearing pads having a leading edge and a trailing edge which is closest to the shaft surface;

scraping means for inhibiting the flow of lubricant between the bearing and the shaft, the scraping means comprising means located between the trailing edge of each bearing pad and the leading edge of an adjacent pad.

11. The bearing of claim 10, further comprising means for directing fluid away from the trailing edge of the bearing pad.

12. The bearing of claim 10, wherein the scraping means comprises a radially inward extending extension of the trailing edge formed integrally with the bearing pad.

13. The bearing of claim 10, wherein the scraping means comprises: a separate radially inward extending scrapper secured to the pad near the trailing edge.

14. The bearing of claim 10, wherein the scraping means comprises an element which is spring biased into contact with the shaft surface.

* * * * *